(12) United States Patent
Adams

(10) Patent No.: US 9,298,581 B2
(45) Date of Patent: Mar. 29, 2016

(54) DYNAMICALLY CONTROLLED SERVER RACK ILLUMINATION SYSTEM

(75) Inventor: Joshua Jon Adams, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

(21) Appl. No.: 12/732,191

(22) Filed: Mar. 26, 2010

(65) Prior Publication Data

US 2011/0239056 A1    Sep. 29, 2011

(51) Int. Cl.
G06F 15/173    (2006.01)
G06F 11/32    (2006.01)
G06F 11/30    (2006.01)

(52) U.S. Cl.
CPC .......... G06F 11/328 (2013.01); *G06F 11/3044* (2013.01)

(58) Field of Classification Search
CPC ....... G06Q 10/20; H04L 41/12; G06F 11/328
USPC ............. 709/203, 224; 340/815.45, 540, 500; 340/568.2, 531; 434/118; 439/490; 361/679.21; 713/300; 345/157; 714/43; 711/114; 718/104; 702/188; 715/771
See application file for complete search history.

(56) References Cited

U.S. PATENT DOCUMENTS

| | | | |
|---|---|---|---|
| 6,188,973 B1 * | 2/2001 | Martinez et al. | 702/188 |
| 6,919,816 B2 * | 7/2005 | Dearborn et al. | 340/815.45 |
| 7,178,941 B2 | 2/2007 | Roberge et al. | |
| 7,234,964 B1 * | 6/2007 | Karstens | 439/490 |
| 7,434,071 B2 * | 10/2008 | Huang et al. | 713/300 |
| 7,441,083 B2 * | 10/2008 | Suzuki et al. | 711/114 |
| 7,522,036 B1 * | 4/2009 | Preuss et al. | 340/531 |
| 7,615,939 B2 | 11/2009 | Halter | |
| 7,642,730 B2 | 1/2010 | Dowling et al. | |
| 7,738,242 B2 * | 6/2010 | McGraw et al. | 361/679.21 |
| 8,264,354 B2 * | 9/2012 | Groth et al. | 340/568.2 |
| 2002/0113714 A1 * | 8/2002 | Lopez | 340/815.45 |
| 2003/0046339 A1 * | 3/2003 | Ip | 709/203 |
| 2004/0177143 A1 * | 9/2004 | Maciel et al. | 709/224 |
| 2005/0195075 A1 * | 9/2005 | McGraw et al. | 340/500 |
| 2006/0121421 A1 * | 6/2006 | Spitaels et al. | 434/118 |

(Continued)

OTHER PUBLICATIONS

"ENTTEC", Retrieved at << http://www.enttec.com/newsletter/2009/aug/customer/article_1.html >>, 2009, pp. 6.

(Continued)

*Primary Examiner* — Dustin Nguyen
(74) *Attorney, Agent, or Firm* — Ben Tabor; Kate Drakos; Micky Minhas

(57) ABSTRACT

Described is a technology by which a server in a server rack is illuminated to indicate its state with respect to an operating mode (e.g., a power mode, an environmental mode, or a performance mode). Data is collected for a server via sensors, power meters and/or the server. Depending on a user-selected operating mode, the server is illuminated at its physical location to indicate its data state based upon the data collected. The mode and collected data result in an illumination of the physical server location that varies by color, intensity and/or flash pattern to indicate the current (or a prior historical) state.

20 Claims, 5 Drawing Sheets

(56) References Cited

U.S. PATENT DOCUMENTS

| | | | |
|---|---|---|---|
| 2007/0027981 A1* | 2/2007 | Coglitore et al. | 709/224 |
| 2007/0050777 A1* | 3/2007 | Hutchinson et al. | 718/104 |
| 2007/0168414 A1* | 7/2007 | Arnold et al. | 709/203 |
| 2008/0129692 A1* | 6/2008 | Sween et al. | 345/157 |
| 2008/0224024 A1 | 9/2008 | Ashdown | |
| 2009/0009092 A1 | 1/2009 | Routledge | |
| 2009/0154159 A1 | 6/2009 | Graybill et al. | |
| 2009/0187654 A1* | 7/2009 | Raja et al. | 709/224 |
| 2009/0243846 A1* | 10/2009 | Yuuki | 340/540 |
| 2009/0271725 A1* | 10/2009 | Dirla | 715/771 |
| 2010/0123578 A1* | 5/2010 | Wray | 340/540 |
| 2011/0066895 A1* | 3/2011 | Windell et al. | 714/43 |

OTHER PUBLICATIONS

"Building a Dynamic Data Center", Retrieved at << http://download.microsoft.com/download/5/7/7/577a5684-8a83-43ae-9272-ff260a9c20e2/Building%20a%20Dynamic%20Data%20Center.doc >>, 2003, pp. 18.

Qu, et al., "Color Control System for RGB LED Light Sources Using Junction Temperature Measurement", Retrieved at << http://ieeexplore.ieee.org/stamp/stamp.jsp?arnumber=04459976 >>, The 33rd Annual Conference of the IEEE Industrial Electronics Society, Nov. 5-8, 2007, pp. 1363-1368.

* cited by examiner

DYNAMICALLY CONTROLLED SERVER RACK ILLUMINATION SYSTEM

BACKGROUND

Information technology (IT) administrators are responsible for the deployment and maintenance of rack-mounted computer equipment. To determine the operational status, performance and health of such systems, administrators remotely poll system information to obtain data, which is then viewed in some format on computer monitor displays, used to generate reports and/or used to provide alerts (e.g., send a page or an email message). Although these are valuable techniques, the data is innately abstracted from the systems being monitored. As a result, the data for a given machine needs to be somehow correlated back to that physical machine so as to give spatial relevancy to the data. This needs to be done using another medium, such as a representative drawing, a predetermined nomenclature, and so forth. It is often confusing and time consuming to determine which data-identified machine is which physical machine among many racks of servers.

Some servers have device-integrated alert mechanisms available, such as a dim blinking red light or a small (e.g., one-line) LCD screen. However, these provide little value to administrators, as they are difficult to see. Moreover, such mechanisms are not consistently implemented by various vendors; for example, among different vendors, different colors, text and/or flash patterns mean different things. As a result, even when present, such small, inconsistent lights/screens are mostly unnoticed and/or ignored.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a server in a server rack may be illuminated to indicate its state with respect to an operating mode. Data is collected with respect to a server, such as provided by sensors, power meters and the server hardware itself, e.g., including performance data. Depending on a current operating mode (e.g., determined by user selection), the server is illuminated at its physical location to indicate its state based upon the data collected.

The operating mode may be a power mode, a temperature mode, or a performance mode, as well as other modes. The data may include power-related data, sensor provided data, and/or performance data, as well as static data queried from the server. The illumination outputs may be different colors, intensities and/or flash patterns to indicate the data/state according to the currently selected mode.

In one implementation, the technology comprises a display mechanism that illuminates servers of a rack of servers. The display mechanism is comprised of independent displays (e.g., LEDs) that are separately controllable to illuminate a subset of the servers, (e.g., a front face of a single server). A controller controls the independent displays to illuminate the selected subset of the servers according to the operating mode and data corresponding to the selected subset of the servers.

In one aspect, the data is maintained in a data store, and includes current data such that the state of the server may be dynamically illuminated based upon its current data. Historical data may also be maintained, to facilitate playback.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
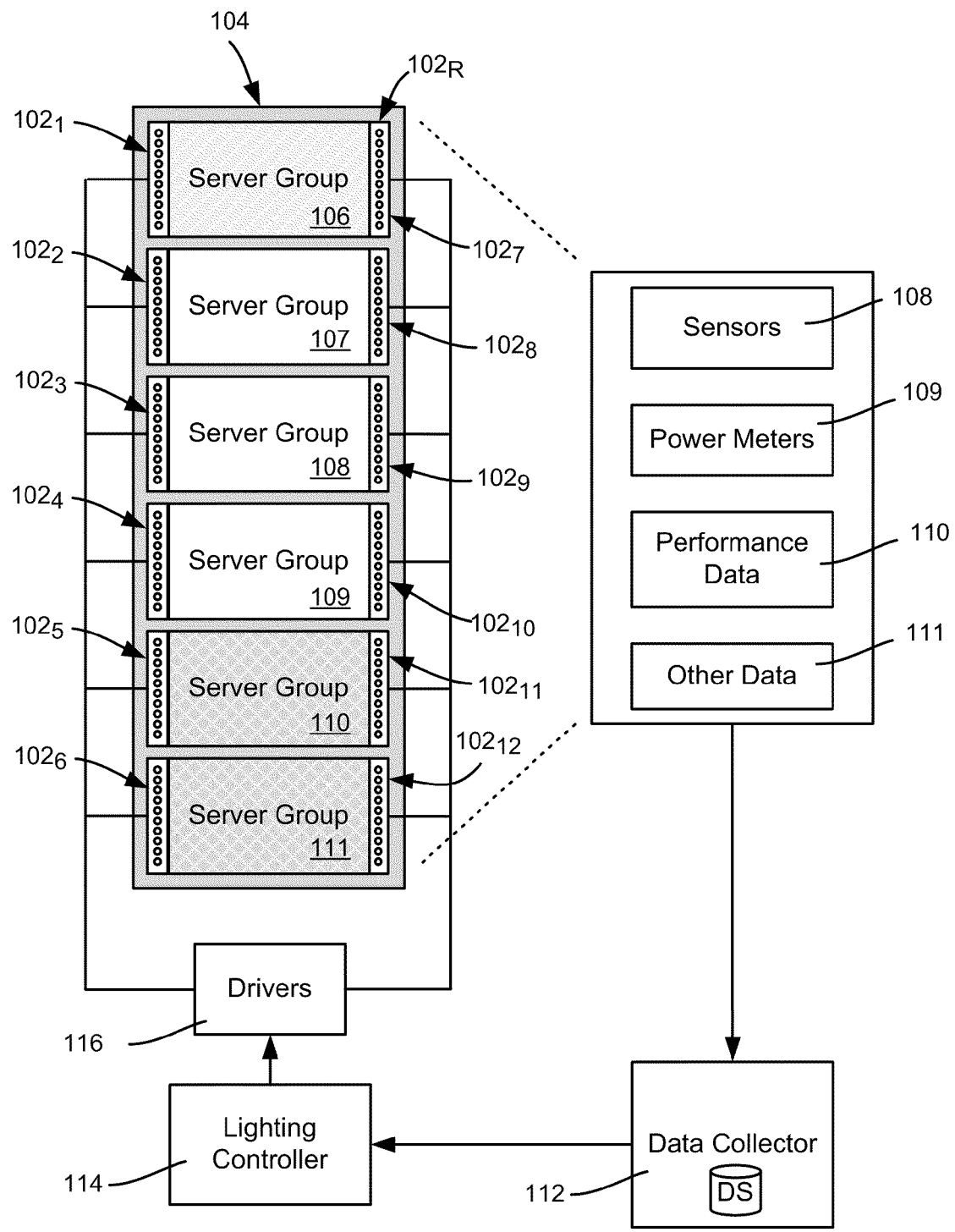
FIG. 1 is a block diagram showing example components for illuminating a physical location of a server based upon data collected with respect to that server.

Various aspects of the technology described herein are generally directed towards a dynamically controlled rack illumination system that includes a display mechanism for illuminating a server or group of servers to convey information to a viewer, such as an administrator or customer/end-user. Note that while the technology is targeted towards IT administrators to an extent, it also may be leveraged by other end-users (tour groups, customers, managers and so forth) to showcase desired information. Further note that different privileges may be given to different types of end users, e.g., tour groups may be allowed to perform certain operations that allow them to observe certain sets of servers showcasing different sets of data.

In one aspect, the end-user selects a display mode, which then illuminates the servers according to their current state data with respect to that selected mode. The technology conveys rapid, at-a-glance information, and also complements remote system monitoring by providing local IT staff and personnel with real-time, readily visible system status information. As will be understood, this lowers costs and streamlines operations by allowing administrators to efficiently locate, report and respond to regularly changing server and datacenter conditions.

In one implementation, LEDs are controlled by an end-user to illuminate the front face of a server (or group of servers), such that the illumination (e.g., color, flash pattern, intensity and/or the like) of each physical server machine or machine grouping is readily visible at the physical location. Various operating modes for real time display are described, including environmental modes (temperature, humidity, airflow, and so forth), power-related modes, performance-related modes and aggregated modes (e.g., performance per watt). Also described is a playback display operation, in which an end-user can replay the past states of a server or group of servers based on historical information with respect to a mode or modes. The playback display may be time-compressed, e.g., replay the past week's power consumption data in five minutes, or time-dilated, e.g., replay the last ten second's CPU utilization over a minute, such as to observe transient data spikes.

While various components are described that implement one example system, it should be understood that any of the examples described herein are non-limiting examples. Indeed, while LEDs are used as examples of display mechanisms herein, any display technology that is able to readily convey visible information that directly identifies a physical location and some characteristic information about that physical location are equivalent alternatives, (e.g., LCD, DLP, plasma, OLED, CRT and so forth, including technologies not yet implemented). As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and providing visible information in general.

FIG. 1 shows various aspects related to one example implementation of a rack illumination system, including individually addressable LED lights $102_1$ and $102_{12}$ surface mounted vertically on both sides of the front of a server rack 104. Suitable lights comprise controllable, low-heat, energy-efficient LEDs that illuminate server faces in over 16.7 million colors (e.g., the Red-Green-Blue, or RGB color space) with varying intensities and/or flash patterns. In the simplified example shown in FIG. 1, there are ten LEDs per left and right side for each grouping of server groups 106-111; however this is only for purposes of illustration. Also, while different shading/non-shading is used to represent different illumination outputs, it is understood that color is likely to be used in an actual implementation.

Figure 2:
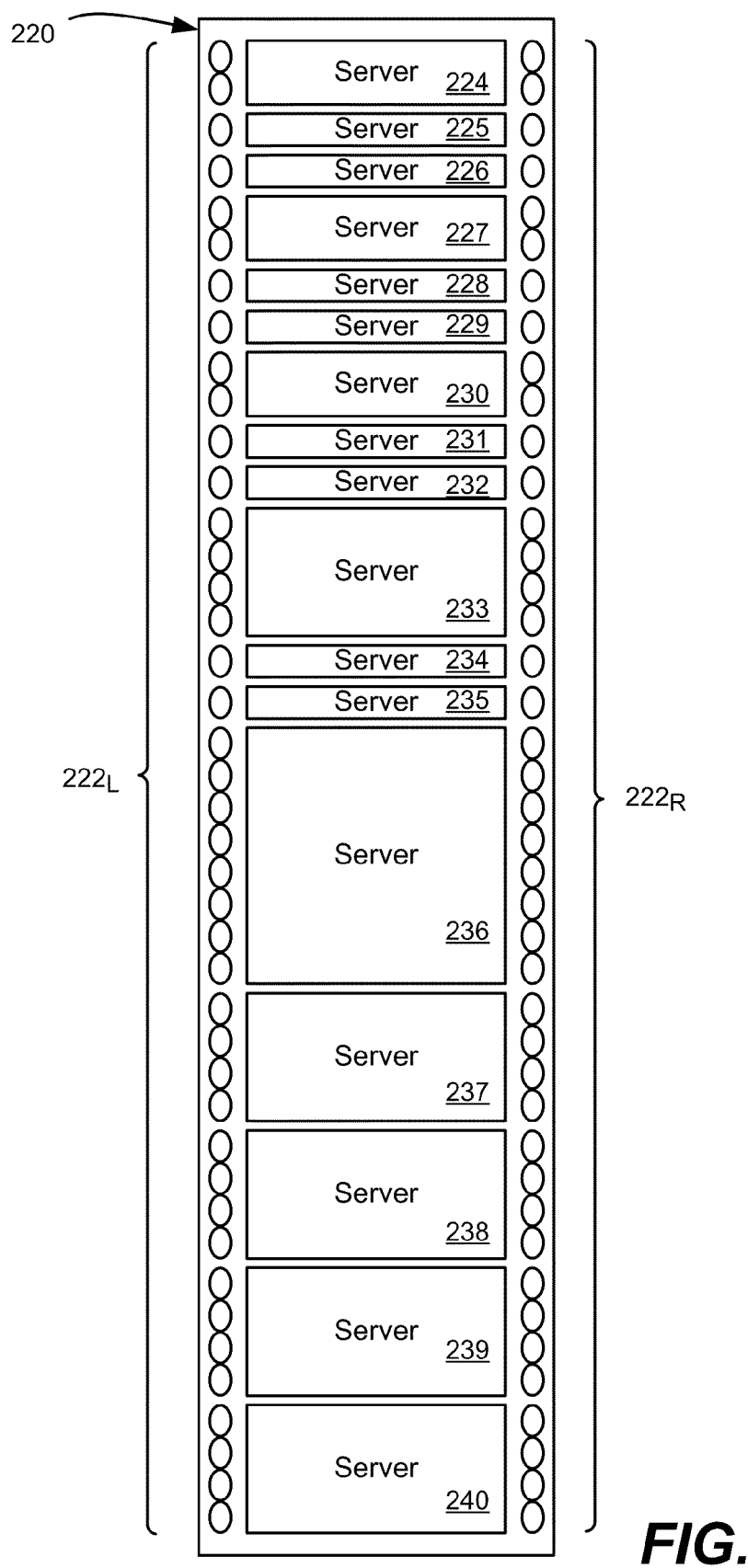
FIG. 2 is a representation of a server rack having example servers therein capable of being illuminated by separate, independently controllable displays (e.g., LEDs) of a display mechanism.

FIG. 2 shows a more typical implementation, in which there is a standard 42 u server rack 220, which may be occupied by up to forty-two servers, (although many types of servers occupy more than 1 u of space). In the example of FIG. 2, the 42 u server rack 220 has forty-two left LED sets $222_L$ and forty-two right LED sets $222_R$, such that each 1 u of the server rack 220 has one left LED set and a right LED set; (an LED set may be one large LED or multiple smaller LEDs clustered together to provide a set of combined LEDs that are sufficiently bright to illuminate the face of each server). As represented in FIG. 2, each of the servers 224-240 has one LED set for each 1 u that it occupies, e.g., the 8 u-sized server 236 has eight left LED sets and eight right LED sets, whereas the 1 u-sized server 232 has one left LED set and one right LED set.

Note that while FIGS. 1 and 2 show left and right LEDs, it is understood that such an arrangement may be only for the purpose of providing a desired brightness level. A rack's server faces may be illuminated by only LEDs on the left of the faces, for example, or only LEDs to the right of the faces. However, left and right LEDs may be illuminated separately for a single server or server group, whereby, for example, additional information may be conveyed; e.g., red left, red right LEDs may convey different information from red left, yellow right LEDs, and so on.

Figure 3:
FIG. 3 is a representation of how an independent display of a display mechanism (e.g., of a server rack) may be associated with the front face of a server.
Figure 4:
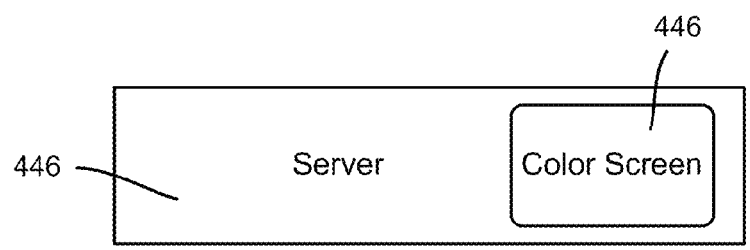
FIG. 4 is an alternate representation of how an independent display of a display mechanism may be associated with the front face of a server.

Moreover, LEDs are only one of the many possible display technologies that may be used to convey visible information directly via the physical server location to an administrator or other viewer (e.g., customer, service personnel). FIG. 3 shows an example in which a light ring 333 (which may be an LED or other display technology) surrounds the server face 335. The ring may be built into the server face, or mounted to it at some time later. FIG. 4 shows an example implementation in which a display panel 444 is integrated into or attached to a server face 446. Note that this is different from a one-line text LCD display because its conveyed information is readily visible from a distance and generally conveys non-textual information such as via differing colors, flash patterns and/or intensity (although such a screen may also be used to display text at desired times). Note that the set of such light rings or panels taken together (e.g., those in the same rack) may be considered a display mechanism having separately controllable displays that each illuminate some subset of the servers.

Figure 5:
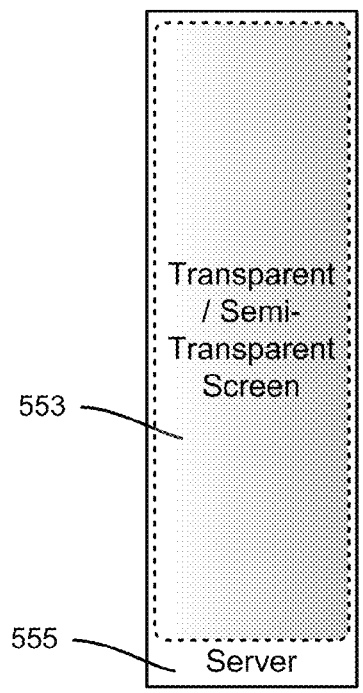
FIG. 5 is a representation of how a transparent or semi-transparent display mechanism may be associated with a server.

FIG. 5 shows another alternative in which a transparent/semi-transparent screen 553 (e.g., a glass server rack door, LED and/or OLED) is positioned in front of a server 555 and selectively illuminated as described herein. There may be one such screen 553 per server or group of servers, including a glass server rack door comprising a transparent screen that juxtaposes the server lighting information over each spatially adjacent server. This allows for identifying servers vertically in racks and/or horizontally, providing for the differentiation of horizontally stacked servers (e.g., the form factor of many contemporary server blade systems).

Note that the server 555 in FIG. 5 is shown in a vertical orientation to exemplify this possibility. However it is understood that this is only an example, and that the technology described herein is independent of server orientation. Indeed, the examples FIGS. 3-5 and other illumination technologies apply to horizontal and/or vertical server orientations, or any other angle, for example.

Returning to FIG. 1, each server and/or server rack is associated with various real-time data as detected by sensors 108 (typically both internal and external to the servers), power meters 109 (voltage, current, power factor) and individual performance data 110 (e.g., CPU load, memory utilization, hard disk data such as throughput, and so forth). Other data 111 may also be obtained from each server (its hardware), including relatively static data, such as server manufacturer, BIOS information, amount of memory, hard disk space, CPU data such as type, number of cores, server age and so forth.

The data available from the various sources 108-111 are collected by a data collector 112. The data may be pulled as desired, or pushed from the sources, depending on each particular source's capabilities. The data may be collected on demand, such as when needed, and/or regularly collected and stored (e.g., every few seconds). Storing historical data with time stamps allows for a playback operation, as described below. Note that commercially available software (e.g., OSIsoft LLC's PI System™ Software) already collects such data, such as for conventional remote access as set forth above.

Various sensors may include temperature, humidity and airflow sensors. For example, servers contain internal sensors that can detect the temperature of the air coming into a server. Rack mounted sensors can detect the temperature of the air coming out of a server, e.g., at least within a certain area, such as via four temperature sensors per rack. Both types of sensors may be employed to provide data.

As described herein, based upon the data collected by the data collector 112 (and maintained in some suitable data store DS), a lighting controller 114, e.g., comprising software, controls the illumination of the servers via drivers 116. In one example implementation, the lighting controller 114 implements an Art-Net communication protocol (maintained by Artistic License Ltd.), transmitting instructions in conforming UDP packets. The drivers 116 may comprise an Art-Net-to-DMX hardware converter (manufactured by ENTTEC Pty. Ltd.) then translates the Art-Net UDP packet instructions to DMX512, a communication protocol native to the lighting units (commonly used to control theatrical lighting). The current standard, DMX512-A, is maintained by the Entertainment Services and Technology Association (ESTA).

In general, the lighting controller 114 queries the data collector (e.g., the data store coupled thereto) for current server-related data, such as operational values. The lighting controller 114 correlates those values with a vertical and/or horizontal position in a specific rack, and adjusts the illumination output (color, flash pattern and/or intensity) to that location based on a currently selected display mode. Note that colors, gradients, intensities and flash patterns may be provided by default and may be user configurable for customized illumination.

In general, the lighting controller 114 software is executed on a device with a user interface that is positioned or portable so as to view the server racks or some subset thereof while the lighting controller 114 is operated. For example, the lighting controller 114 may have a user interface in the form of a touch screen panel mounted per rack or group of racks (regardless of where the actual software executes), whereby operations are controlled with human touch and/or gesture, including for example a touch interface capable of tracking multiple touch points and gestures for use in controlling the operations. The lighting controller may be implanted in a hand-held device, Smartphone, a personal digital assistant (PDA), a laptop computer and so forth.

Various operating modes may be provided, including a power mode, a temperature mode, a CPU utilization mode and a network utilization mode. The end-user selects which mode is operational at any given time to view the actual server's current state. For example, in the power mode, the lights illuminate the individual server fronts in varying shades and/or intensities, such as from green (low power) to red (high power). If the servers in the top of the rack are pulling large amounts of power and the rest are not, the top of the rack thus glows red while everything else remains green, identifying at a glance an otherwise obscured but likely important operational variable.

In the temperature mode, servers in zones with high temperature readings may be illuminated to glow red, while lower temperature servers glow blue. In the CPU utilization mode, servers in zones with high CPU utilization may glow/flash orange, while others may glow shades of yellow and green depending on their current workload. In the network utilization mode, servers in zones with high network utilization may glow/flash white while others stay dark. As can be readily appreciated, the illumination output in the form of colors, gradients, patterns and intensities are customizable, as are the thresholds that change those illumination outputs.

Many other operating modes, including customizable modes, are feasible. One type of mode is an aggregation mode, in which two or more types of data are mathematically combined in some way and correlated to an illumination output that is mapped to a server or server group. By way of example, CPU utilization may be aggregated with power data, such as by a mode that shows performance per watt. This may be useful, for example in differentiating servers that are working hard and thus justifiably consuming power from one that is doing little work yet consuming more power than is typical for its workload, indicating a potential problem.

Virtually any data that may be queried may correspond to a mode that results in illuminated output information. For example, an end-user may query for and receive a response so as to illuminate only those servers that are three years or older, as part of a replacement program. An end-user may illuminate those servers that have capacity for more memory so that memory may be added, those that need software maintenance, those manufactured by a certain vendor, those associated with an outstanding service ticket, and so on.

Such a query may be more complex than a single filtering query. For example, an end-user may input several criteria, and have the servers that meet most or all of the criteria glow one way, those that meet some amount glow another, and those that meet little or none glow another.

A mode of operation for "problem notification" may be provided to allow checking for problems via a quick glance. For example, an end-user may set various thresholds in such a mode, such as related to temperatures, power consumption, workload-related thresholds, and so forth. If a server exceeds any threshold, that server is illuminated to differentiate it in some way, such as flashing red, (although the type of problem may be color coded as well, e.g., flash red for temperature, flash blue for high power consumption and so on). If the server approaches the threshold, a dimmer and/or steady (non-flashing or slow flashing) illumination may be used as a less urgent warning.

Turning to another aspect, any operating mode may be played back in time to illuminate the servers based upon historical data, rather than current data. More particularly, if historical data is maintained with a timestamp (or in another time-retrievable manner), the lighting controller 114 can query for the data at a previous time rather than the current time. Thus, for example, if there was a problem overnight, the end-user can replay the data with respect to one or more modes to see which server had the problem, and when. Note that playback may be simulated on a computer screen rather than by actual illumination, however illumination of the physical machine may provide additional value. The playback may be time-compressed (all of last week shown in five minutes), or the end-user may fast forward, rewind and so forth to hone in on a problem, for example. The playback may be in slow motion (time dilation) as described above.

Figure 6:
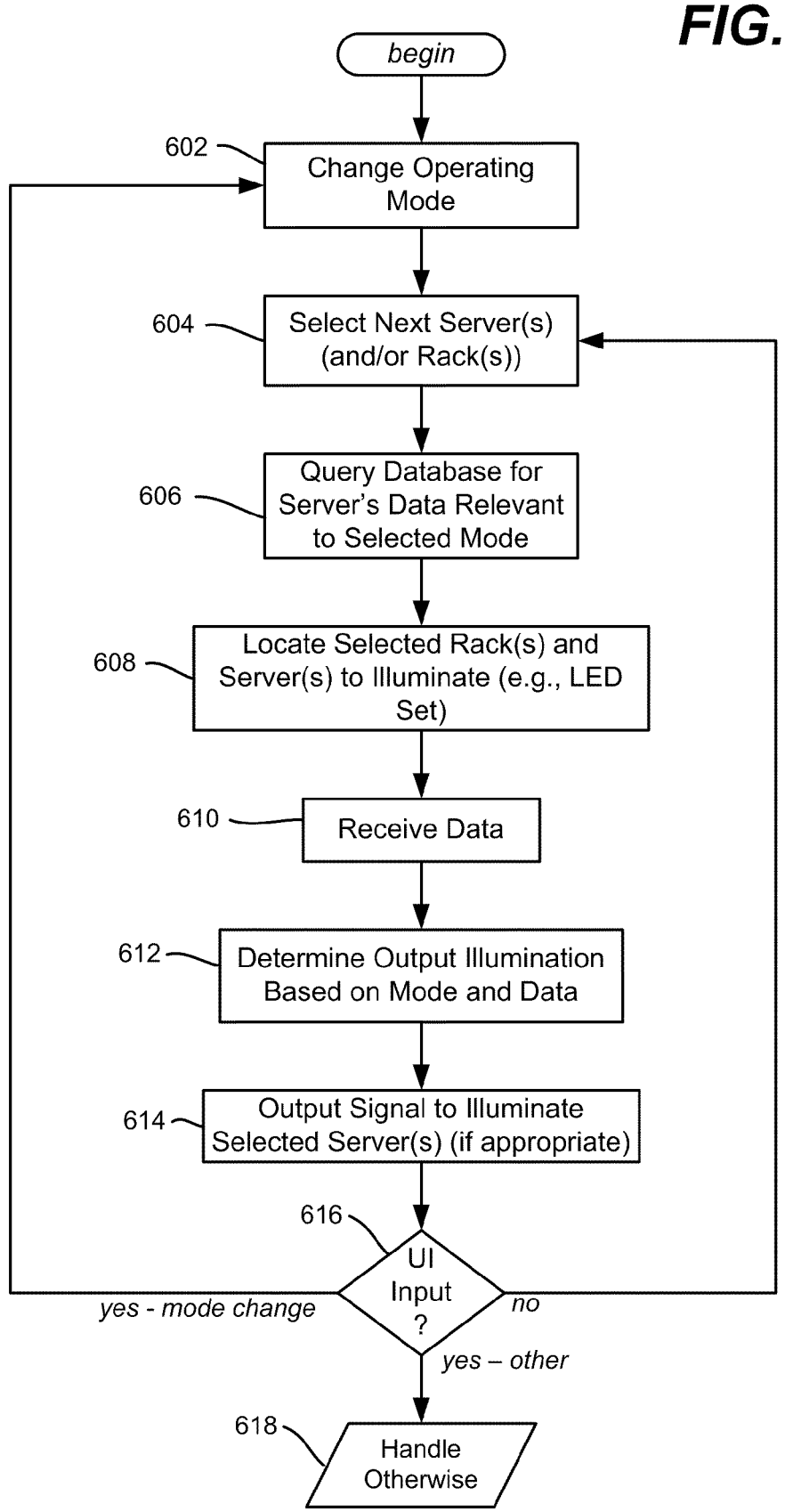
FIG. 6 is a flow diagram showing example steps that may be taken to illuminate a server with an illumination output that is based on data collected with respect to that server and a currently selected operating mode.

FIG. 6 summarizes a number of aspects in example steps of a flow diagram. At step 602, the lighting controller 114 changes to the operating mode selected by an end-user, such as via a direct user interface of the lighting controller 114, or in the case of a lighting controller 114 implemented with a client/server architecture, via an Application Programming Interface (API) that can be accessed locally or remotely (e.g., through a web service). Note that an automated process may also change the operating mode, such as to go into an off-hours mode at a certain time until another time or until overridden.

The lighting controller selects a rack and/or server at step 604. For example, the lighting controller 114 may start with rack 1, server 1 and serially advance through the servers of each rack to illuminate each as appropriate. Other selection scenarios are possible, e.g., first illuminate those with outstanding events, and then poll for other data.

Another option is to perform some or all of the process in parallel. For example, the controller may spawn threads responsible for each rack or some other logical sub-section (e.g., within a rack or multiple racks), such that the call to illuminate the racks is asynchronous (parallel) rather than synchronous (serial) by the lighting controller. Thus, the steps of FIG. 6 refer to "server(s)" and/or "rack(s)" to indicate the possibility of asynchronous/parallel operations.

As represented by step 606, based on the operating mode and selected server, the lighting controller 114 queries the data collector (data store) 112 containing the current (or, if desired historical) data relevant to that mode and server, as described above. The lighting controller 114 also determines the corresponding rack and vertical and/or horizontal position within the rack, as represented by step 608, for illumination.

When the data is received (step 610), the lighting controller 114 determines the output illumination, comprising a specific color mix, flash pattern and/or intensity for that location. Note that this output illumination may be the same for both left and right LEDs, for example, or may be different. In the examples of FIGS. 3-5, more than one color also may be output at the same time, including many colors, such as a gradient that changes color from one point on the independent display to another.

As represented by step 614, the lighting controller 114 sends out a signal so as to instruct/drive the LEDs or display corresponding to the given vertical/horizontal position to illuminate that position as specified at step 612. Note that this may be per server such as in FIGS. 2-4, but may also be for some subset of the LEDs close to the vertical position, as in FIG. 1. Further note that this signal is only output if some illumination is appropriate, e.g., the data and mode may correspond to leaving the server as is, including a non-illuminated state.

Step 616 represents (ordinarily) repeating the process for the next server and so on, including servers in different racks as appropriate. Again, note that some or all of the operations may be performed asynchronously/in parallel on multiple servers and/or racks at the same time. Note that the end-user can limit the illumination to a specific subset of servers, subset of racks and so on (whereby step 604 selects accordingly).

The process thus continues by returning to step 604 until some user interface-initiated input is received, as also represented by step 616; (note that as described above, an automated process may likewise initiate such input). One such input corresponds to a mode change, whereby step 616 returns to step 602. Other such input is handled as appropriate as generally represented by step 618, such as to shut down the illumination, e.g., to save power until an administrator returns in the morning.

As can be seen, there is provided dynamically controlled direct illumination of servers based on real-time (or historical) server conditions without the need for indirect data visualization abstraction. The technology thus facilitates more effective management, control, utilization and identifying of server hardware by IT administrators and personnel, as well as facilitates the education of other end-users who may select an illumination mode according to appropriate privileges granted to them.

Exemplary Operating Environment

Figure 7:
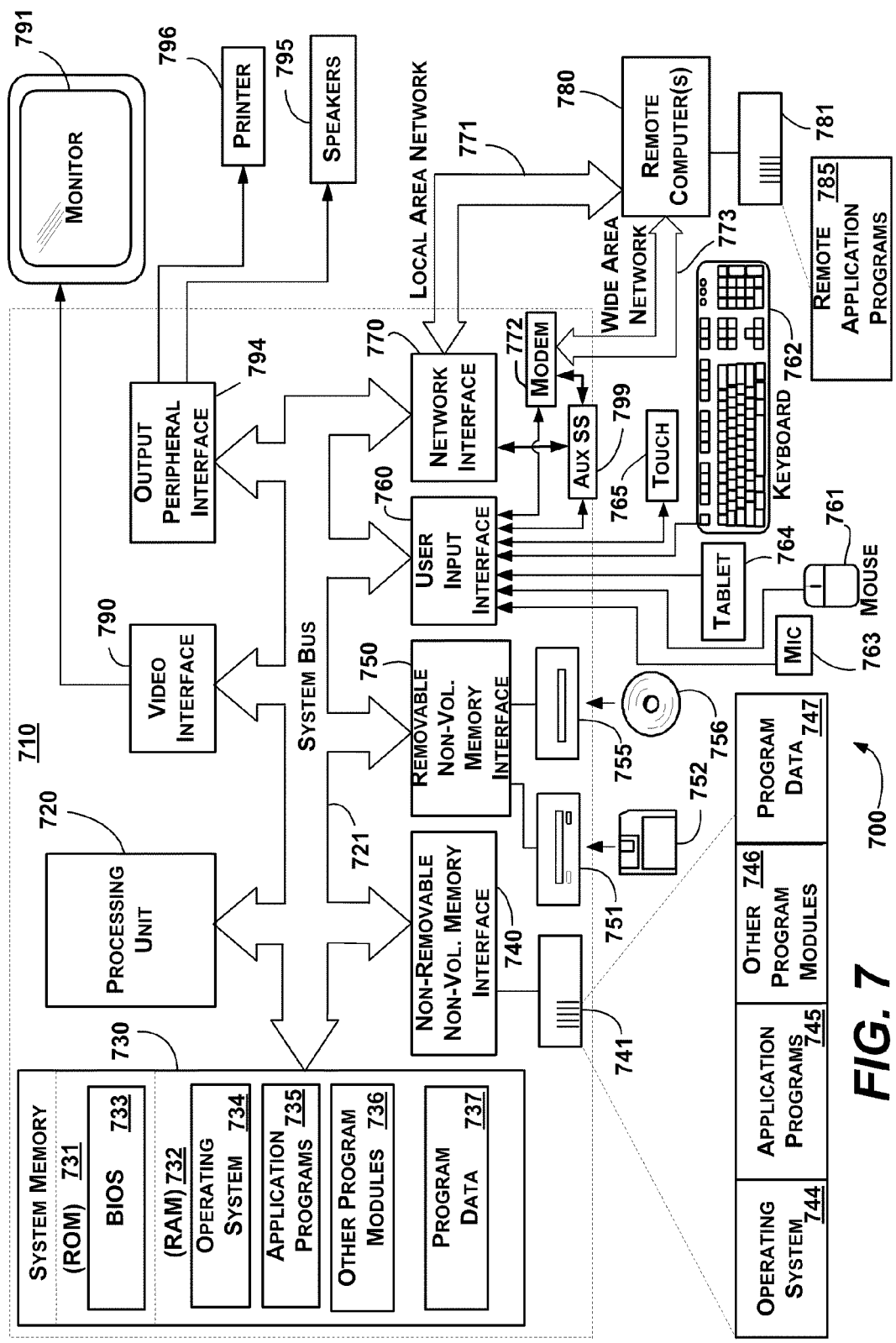
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, touch devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during startup, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a touch sensitive mechanism 765, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor, comprising:
   obtaining data collected with respect to a server by querying a data store for historical data with respect to the server, the data including information that indicates a state of the server in operation including operational performance data;
   receiving a user-selected operating mode for the server that corresponds to server state-based illumination, in which the user-selected operating mode corresponds to an aggregation mode in which two or more types of data are mathematically combined and correlated to an output illumination;
   playing back one or more past states of the server with respect to the user-selected operating mode; and
   illuminating the server at its physical location with the output illumination to indicate the state of the server with respect to the user-selected operating mode.

2. The method of claim 1 wherein obtaining the data comprises querying a data store for current data with respect to the server.

3. The method of claim 1 wherein the one or more past states of the server are played back based upon the historical data, in which the playing back comprises providing at least one of: fast forward, rewind, time-compression or slow motion playback.

4. The method of claim 1 wherein obtaining the data comprises obtaining power-related data, sensor provided data, or network-related data, or any combination of power-related data, sensor-provided data or network-related data.

5. The method of claim 1 wherein obtaining the data comprises obtaining static data queried from the server.

6. The method of claim 1 wherein illuminating the server with the output illumination comprises determining at least one color, intensity or flash pattern, or any combination of at least one color, intensity or flash pattern.

7. The method of claim 1 wherein receiving the user-selected operating mode comprises receiving input from a user to select a power mode or an environmental mode corresponding to a changed operating mode for the server.

8. A system, comprising:
   a display mechanism configured to illuminate one or more servers of a rack of servers, the display mechanism comprising independent displays that are separately controllable to illuminate a subset of the servers including servers in operation; and
   a controller configured to control the independent displays to illuminate a selected subset of the rack of servers according to data corresponding to the selected subset of the rack of servers with respect to a selected operating mode including an aggregated mode, in which the controller combines and correlates two or more types of data and the selected operating mode with an illumination output comprising at least one of color, intensity, or flash pattern, and illuminates the selected subset of the rack of servers with the illumination output.

9. The system of claim 8 wherein the controller is coupled to a data store to obtain the data corresponding to the selected subset of the servers.

10. The system of claim 8 wherein the display mechanism comprises a plurality of light-emitting diodes, the light-emitting diodes configured to illuminate one or more server faces corresponding to the selected subset of the servers.

11. The system of claim 8 wherein the display mechanism comprises a plurality of displays, and at least one display of the plurality of displays is associated with a front face of a server.

12. The system of claim 8 wherein the data comprises current power-related data, sensor provided data, or performance data, or any combination of current power-related data, sensor provided data, network-related data or performance data.

13. The system of claim 8 wherein obtaining the data comprises obtaining static data queried from the server.

14. The system of claim 8 wherein the selected operating mode comprises a power mode, a environmental mode, or a performance mode.

15. The system of claim 8 wherein at least some of the data corresponding to the selected subset of the servers is provided by a temperature sensor, a humidity sensor, an airflow sensor, a power meter, a performance data counter, server hardware, storage device hardware, or network hardware, or any combination of a temperature sensor, a humidity sensor, an airflow sensor, a power meter, a performance data counter, server hardware, storage device hardware, or network hardware.

16. The system of claim 8 wherein the selected subset of the servers comprises a single server in the rack of servers.

17. One or more computer-readable storage media devices having computer-executable instructions that are executable by a processor to perform operations comprising:
   receiving input that selects an operating mode for at least one server that corresponds to playback of server state, the operating mode corresponding to an aggregation mode;
   selecting a selected server set comprising the at least one server;
   querying for historical state data collected with respect to at least some of the servers of the selected server set;
   receiving the data in response to querying for the data, the received data including a plurality of types of data;
   mathematically combining two or more types of the received data; and
   determining an output based upon the operating mode and the mathematically-combined two or more types of the received data.

18. The one or more computer-readable storage media devices of claim 17 wherein determining the output based upon the operating mode and the historical state data comprises determining output illumination, and having further computer-executable instructions that are executable by the processor to perform operations comprising, outputting a signal to illuminate a physical location corresponding to at least some of the servers of the selected server set with the output illumination.

19. The system of claim 8, wherein the controller is configured to advance through the one or more servers of the rack of servers in serial such that a call to illuminate the independent displays is synchronous.

20. The system of claim 8, wherein the controller is configured to advance through the one or more servers of the rack of servers in parallel such that a call to illuminate the independent displays is asynchronous.

* * * * *